US010706634B1

(12) United States Patent
Baumbach et al.

(10) Patent No.: US 10,706,634 B1
(45) Date of Patent: Jul. 7, 2020

(54) SYSTEM FOR GENERATING AUGMENTED REALITY CONTENT FROM A PERSPECTIVE VIEW OF AN UNMANNED AERIAL VEHICLE

(71) Applicant: Disney Enterprises, Inc., Burbank, CA (US)

(72) Inventors: Elliott Baumbach, Porter Ranch, CA (US); Nathan Nocon, Valencia, CA (US); Hunter Gibson, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 16/513,169

(22) Filed: Jul. 16, 2019

(51) Int. Cl.
*G06T 19/00* (2011.01)
*B64C 39/02* (2006.01)
*G06K 9/00* (2006.01)
*H04W 4/021* (2018.01)

(52) U.S. Cl.
CPC .......... *G06T 19/006* (2013.01); *B64C 39/024* (2013.01); *G06K 9/00671* (2013.01); *H04W 4/021* (2013.01); *B64C 2201/127* (2013.01)

(58) Field of Classification Search
None
See application file for complete search history.

(56) References Cited

U.S. PATENT DOCUMENTS

| 2018/0098052 A1* | 4/2018 | Black | H04N 13/275 |
| 2019/0318181 A1* | 10/2019 | Katz | B60W 40/09 |
| 2019/0377345 A1* | 12/2019 | Bachrach | B64C 39/024 |
| 2020/0073385 A1* | 3/2020 | Jobanputra | G06F 9/547 |

* cited by examiner

*Primary Examiner* — Frank S Chen
(74) *Attorney, Agent, or Firm* — Esplin & Associates, PC

(57) ABSTRACT

A system has an augmented reality device and an unmanned aerial vehicle. The augmented reality device captures, from a perspective view of the augmented reality device, real-world imagery of a user within an augmented reality environment. Further, the augmented reality device generates virtual imagery to overlay the real-world imagery captured by the augmented reality image capture device from the perspective view of the augmented reality device. Finally, the augmented reality device determines a position and an orientation of an augmented reality device accessory within a common coordinate space. Moreover, the unmanned aerial vehicle captures, from a perspective view of the unmanned aerial vehicle, real-world imagery of the user within the augmented reality environment. The unmanned aerial vehicle determines a position of the unmanned aerial vehicle within the common coordinate space. Further, the unmanned aerial vehicle generates virtual imagery to overlay the real-world imagery captured by the unmanned aerial vehicle.

20 Claims, 18 Drawing Sheets

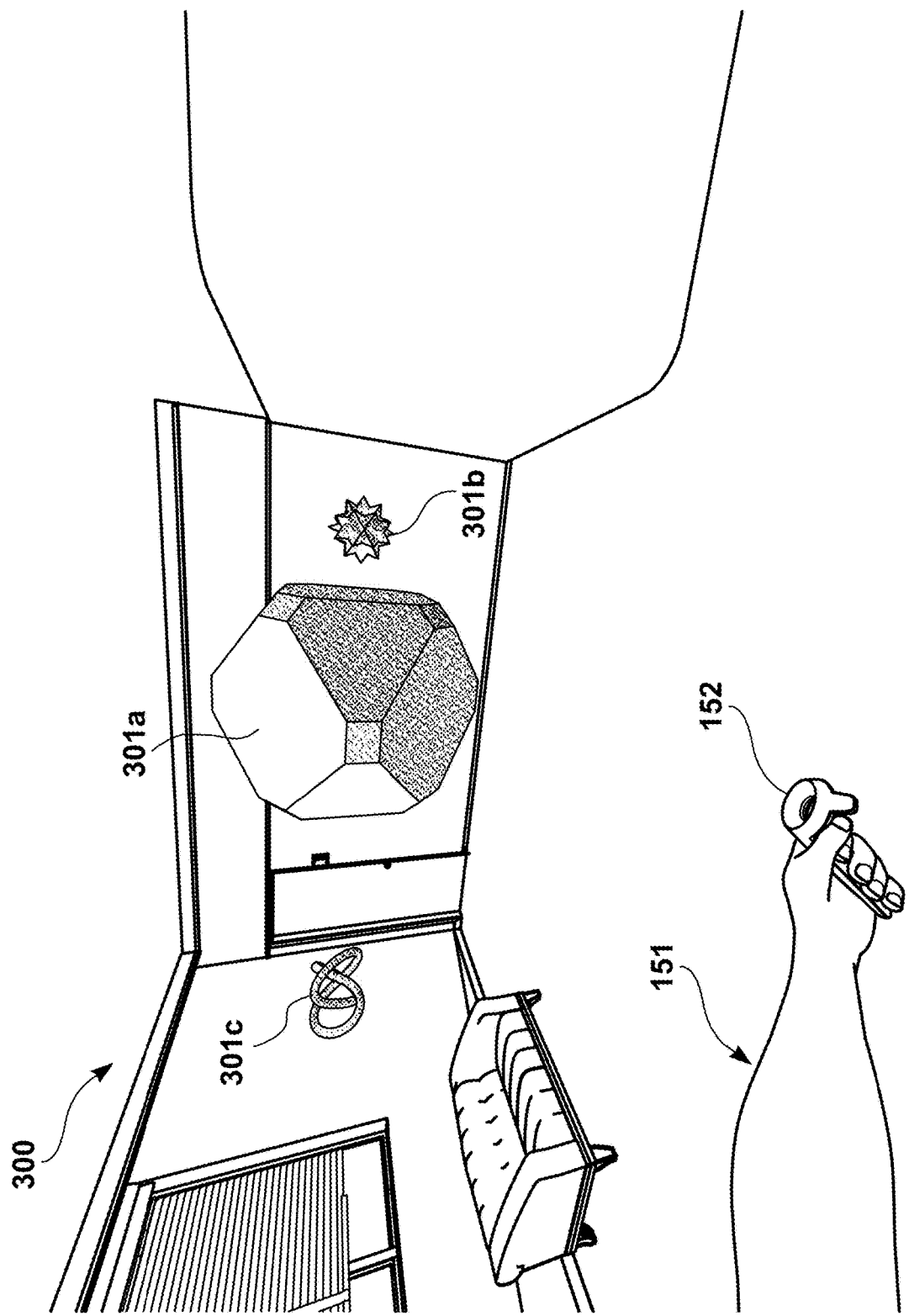

SYSTEM FOR GENERATING AUGMENTED REALITY CONTENT FROM A PERSPECTIVE VIEW OF AN UNMANNED AERIAL VEHICLE

BACKGROUND

1. Field

This disclosure generally relates to the field of augmented reality ("AR"), often referred to as mixed reality ("MR") when an experience is provided via a head-mounted display ("HMD") device. More particularly, the disclosure relates to a system that generates AR content.

2. General Background

AR is used in a variety of contexts (e.g., gaming, medicine, etc.) to provide a virtual experience in conjunction with a real-world experience (e.g., an overlay of various text and/or images over a real-world object, person, place, etc.). A user may use various devices, which are worn or held by the user, to allow the user to view real-world elements along with virtual elements during an AR experience.

Unlike a VR experience, which only encompasses virtual content, an AR experience poses specific challenges for recording purposes. For example, if an image capture device (e.g., camera) was worn in conjunction with an AR display device by the user, the recorded content would typically include shaky movements resulting from the user's natural head and/or limb articulations; this is in contrast to a VR experience in which the recorded content may be confined to virtual imagery in isolation of real-world artifacts. Therefore, conventional AR systems do not adequately capture AR content during an AR experience with sufficient quality to allow for simultaneous, or subsequent, viewing by another user at a viewing device other than the AR device used by the user.

SUMMARY

In one aspect, a system is provided. The system has an AR device that captures, from a perspective view of the AR device, real-world imagery of a user within an AR environment. Further, the AR device generates virtual imagery to overlay the captured real-world imagery from the perspective view of the AR device. Finally, the AR device determines a position and an orientation of an AR device accessory within a common coordinate space.

Moreover, the system has an unmanned aerial vehicle ("UAV") that captures, from a perspective view of the UAV, real-world imagery of the user within the AR environment. The UAV determines a position of the UAV within the common coordinate space. Further, the UAV generates virtual imagery to overlay the captured real-world imagery from the perspective view of the UAV. The UAV also receives the position and orientation from the AR device accessory. Additionally, the UAV modifies the virtual imagery based on the position and orientation of the AR device accessory within the common coordinate space. The UAV generates a composite of the captured real-world imagery from the perspective view of the UAV and the modified virtual imagery from the perspective view of the UAV.

In another aspect, a process is provided to perform the functionality of the system. In yet another aspect, a non-transitory computer readable storage device has a computer readable program stored thereon that executes the process.

BRIEF DESCRIPTION OF THE DRAWINGS

The above-mentioned features of the present disclosure will become more apparent with reference to the following description taken in conjunction with the accompanying drawings, wherein like reference numerals denote like elements and in which:

FIG. 4A illustrates the overlay imagery that is generated by an AR device processor for positioning within the AR environment.

DETAILED DESCRIPTION

A system is provided for generating AR content from a perspective view of a UAV rather than a user participating in an AR experience. In contrast with conventional approaches that capture an AR experience from the perspective of the user, which can only be effectively accomplished via attachment to the user (e.g., a camera attached to an AR device worn by the user), the system includes a UAV in addition to the AR device (e.g., head-mounted display ("HMD"), AR glasses, etc.) worn by the user. The system may generate AR content from the perspective view of the UAV, which captures the real-world movements of the user. As a result, the AR content is obtained (i.e., temporarily stored for streaming, recorded for subsequent viewing, etc.) by the system from a more stable vantage point (i.e., that of the UAV) than previous approaches, allowing for higher quality AR content to be shared with other users.

Although specific examples and illustrations are provided herein with respect to the use of a UAV to generate the AR content from the perspective view of the UAV, other types of devices may be used instead. For example, a robot that is mobile with respect to the ground, rather than the air, may be used in place of a UAV. As another example, a first user's movements may be tracked by an AR device of a second user from the perspective view of that second user. Accordingly, the AR content is not limited to being generated with a UAV.

Figure 1A:
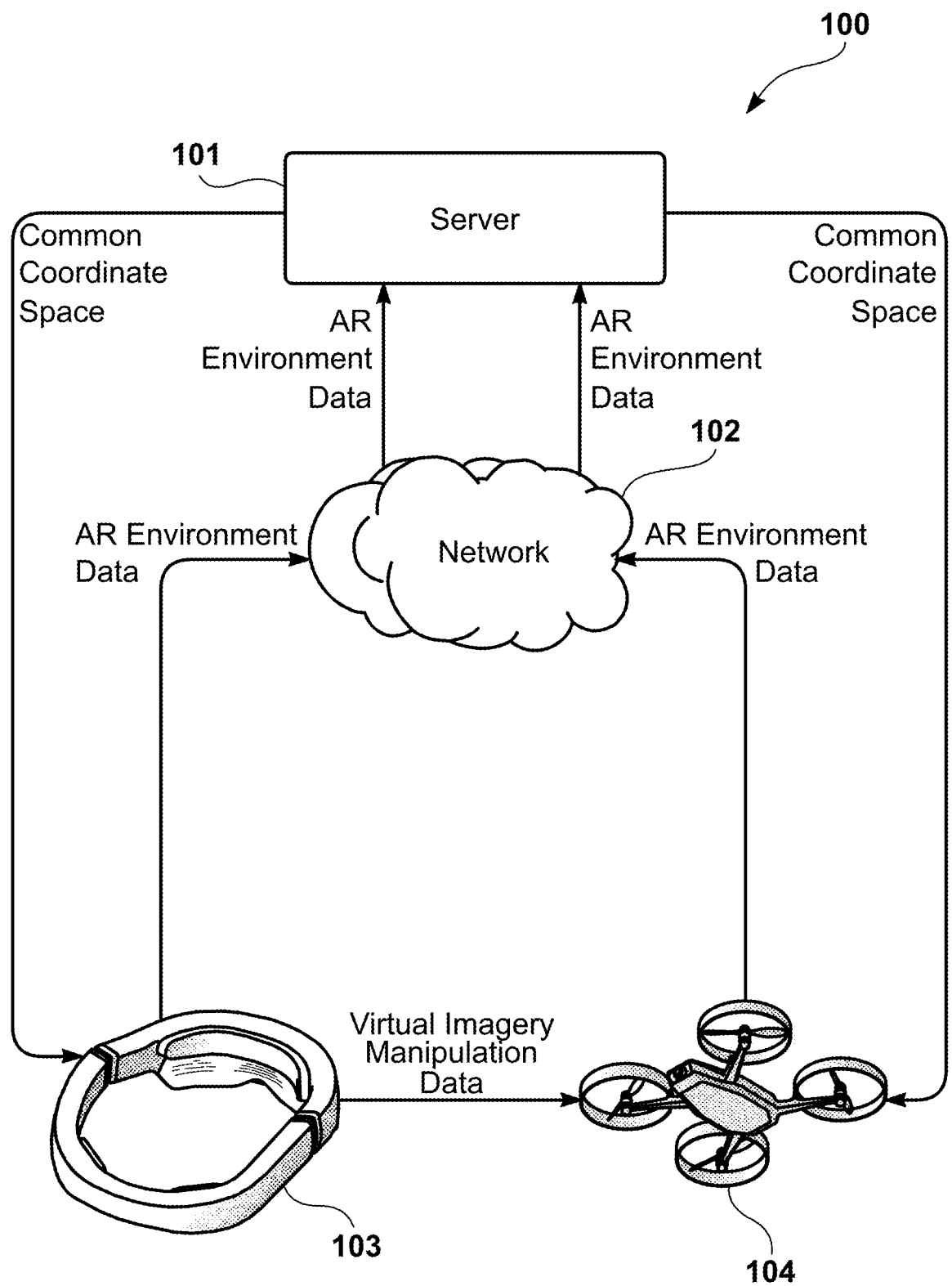
FIG. 1A illustrates an AR content generation system that generates AR content from a viewing perspective of a UAV.

FIG. 1A illustrates an AR content generation system 100 that generates AR content from a perspective view of a UAV 104. In one embodiment, the AR content generation system 100 has a server 101 (e.g., cloud-based computing device, game console, etc.), which generates a common coordinate space for the UAV 104 and an AR device 103 operated by a user. In other words, independently of the AR content generation system 100, the UAV 104 and the AR device 103 may each calculate their own respective coordinate systems. To be able to communicate effectively about the AR environment in which both the UAV 104 and the AR device 103 are situated, the AR content generation system 100 uses the server 101 to generate a common coordinate space. In one embodiment, the UAV 104 and the AR device 103 each provide AR environment data to the server 101; such AR environment data may be point cloud data of the AR environment that is obtained via integrated three-dimensional ("3D") scanners within the UAV 104 and the AR device 103. After generating point clouds (i.e., 3D models of objects within the AR environment), the UAV 104 and the AR device 103 may send their respective point cloud data to the server 101. By coalescing the various point cloud data, and potentially other sensed data (e.g., location data from a GPS), the server 101 may generate a common coordinate space 160 (FIG. 1C) that may be used by both the UAV 104 and the AR device 103; in other words, both the UAV 104 and the AR device 103 will understand a particular set of coordinates (x, y, and z) to refer to the same location within the AR environment. As an example, Simultaneous Localization and Mapping ("SLAM") may be used to generate the common coordinate space 160.

Upon providing respective AR environment data to the server 101 via a network 102, the UAV 104 and the AR device 103 await processing of the AR environment data by the server 101. The server 101 then generates the common coordinate space 160, and provides the common coordinate space data via the network 102 to each of the UAV 104 and the AR device 103. As a result, the AR device 103 may communicate directly (e.g., via wireless communication) with the UAV 104 to provide the location of the AR device 103 (and/or associated componentry), the orientation of the AR device 103 (and/or associated componentry), and AR experience data (e.g., game data) so that the UAV 104 may generate a corresponding virtual overlay from the perspective view of the UAV 104. In other words, both the AR device 103 and the UAV 104 may simultaneously capture real-world imagery and generate corresponding virtual overlay data, but the AR device 103 may be primarily responsible for detecting specific user interaction data (e.g., a user touching a virtual object within the AR environment) that it may more accurately detect than the UAV 104. Accordingly, rather than relying on a less accurate generation of such data, the UAV 104 generates its version of the virtual overlay data and manipulates that version based on the user interaction data received as virtual imagery manipulation data from the AR device 103.

Movement of the UAV 104 to an optimal position/orientation may be accomplished in a variety of ways. For example, the UAV 104 may position and orient itself (i.e., autonomously) based on the location, orientation, and AR experience data provided by the AR device 103. In other words, the AR device 103 may generate the optimal position and/or orientation for the UAV 104, send that optimal position and/or orientation to the UAV 104, and allow the UAV 104 to manage flight stabilization and object avoidance based on the provided data. As another example, the AR device 103 may directly control the position and orientation of the UAV 104 without flight operation management by the UAV 104.

Figure 1B:
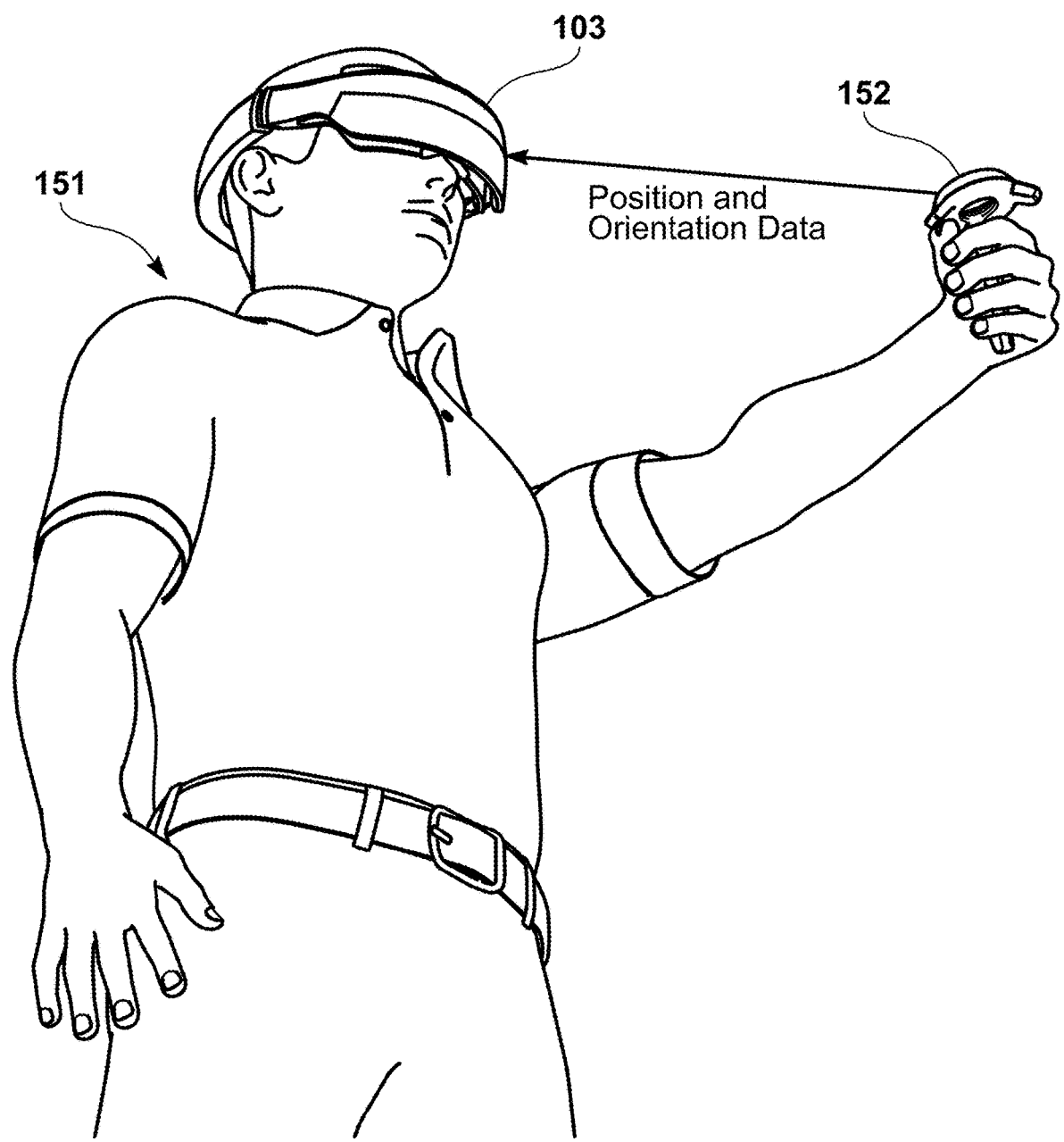
FIG. 1B illustrates the AR device illustrated in FIG. 1A communicating with an AR device accessory.
Figure 1C:
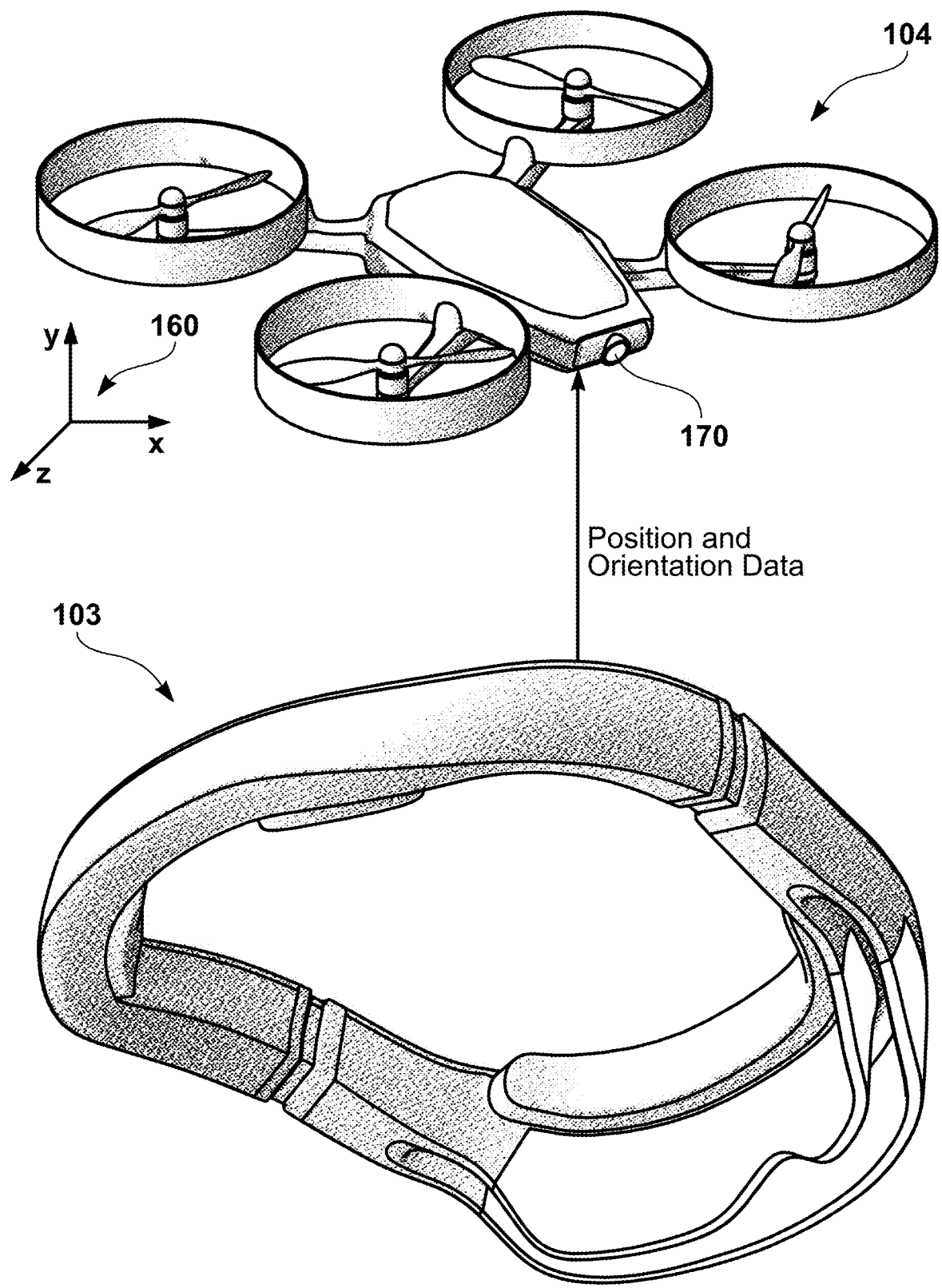
FIG. 1C illustrates the AR device illustrated in FIG. 1A communicating directly with the UAV illustrated in FIG. 1A.

In another embodiment, the server 101 may translate the coordinate space of one device (e.g., the coordinate space of the UAV 104) into the coordinate space of the other device (e.g., the coordinate space of the AR device 103), and such translated coordinate space may act as the common coordinate space 160 (FIG. 1C). In other words, a first device may continue to use its own coordinate space, while the second device uses a translated coordinate space that correlates to that of the first device. Alternatively, one of the devices 103 and 104 may perform such coordinate space translation without the server 101.

In yet another embodiment, a tracking configuration may be utilized without construction of a map or translation of coordinates. For example, one or more markings may be positioned on the AR device 103. The UAV 104 may then track the AR device 103 via the markings.

FIG. 1B illustrates the AR device 103 (e.g., HMD) illustrated in FIG. 1A communicating with an AR device accessory 152 (e.g., hand controller). For instance a user 151, the participant in the AR experience, may wear or hold the AR device 103. Further, the user 151 may wear or hold the AR device accessory 152. In one embodiment, the AR device 103 may determine the position and/or orientation of the AR device accessory 152 by tracking the AR device accessory 152 via one or more image capture devices integrated within the AR device 103. In another embodiment, the AR device accessory 152 may send, via wireless or wired communication, the position and/or orientation data to the AR device 103. By way of the AR device accessory 152, the AR device 103 may determine if, and how, the user 151 is interacting with virtual objects (e.g., via touch) within the AR experience.

For example, the AR device 103 may use one or more image capture based tracking processes (e.g., light blob detection, glyph recognition, 3D image recognition, etc.) via one or image capture devices (e.g., cameras) mounted onto the AR device 103. Accordingly, as the AR device accessory 152 moves within the common coordinate space 160 (FIG. 1C), the AR device 103 is able to track the coordinate translational movement. With respect to orientation, one or more inertial measurements units ("IMU") may be integrated within the AR device accessory 152 to measure the pitch, roll, and/or yaw of the AR device accessory 152. Further, the AR device accessory 152 may deliver the orientation data via wireless communication with the AR device 103. (Examples of the IMUs include accelerometers, gyroscopes, and magnetometers.) Alternatively, the orientation data may also be determined by the foregoing image capture based tracking processes.

FIG. 1C illustrates the AR device 103 illustrated in FIG. 1A communicating directly with the UAV 104 illustrated in FIG. 1A. After being able to communicate in the common coordinate space 160, which may be generated by the server 101 illustrated in FIG. 1A, the AR device 103 may provide the position and orientation data of itself, and its accessories, within that common coordinate space 160 to the UAV 104. As an example, the AR device 103 may also provide the position of the AR device accessory 152 (e.g., one or more hand controllers) within the common coordinate space 160. The AR device 103 may also control and provide the position and/or orientation of the UAV 104 within the common coordinate space 160.

In one embodiment, the common coordinate space 160 may be predetermined prior to initiation of the AR experience. In another embodiment, the common coordinate space 160 may be dynamically generated and/or updated during the AR experience. Further, although the server 101 is illustrated in FIG. 1A as being external to the AR device 103, the server 101 may be integrated within the AR device 103 to operate locally within the AR device 103, and communicate with other devices (e.g., the UAV 104) from the AR device 103.

Upon determining the position and orientation of the one or more hand controllers 152, the AR device 103 may send that data to the UAV 104. In other words, the UAV 104 need not calculate the position and orientation of the one or more hand controllers 152, which may be difficult to do from a perspective view other than that of the user. For example, the UAV 104 may not always be in a position with a clear line of sight to the AR device accessory 152 (e.g., behind the shoulder of the user 151). Accordingly, the UAV 104 is able to obtain more accurate and constant data regarding the position of the AR device accessory 152 from the AR device 103 than by generating such data itself. Further, the UAV 104 may also obtain position and orientation data of the AR device 103. For example, the tilt of the head of the user 151 may be determined by the AR device 103, and provided to the UAV 104.

Further, the UAV 104 may have an image capture device 170 (e.g., camera) positioned thereon. The UAV 104 may use the image capture device 170 to capture real-world imagery of the user 151 within the AR environment; such imagery may be subsequently used with the position and orientation data of the AR device accessory 152 to generate AR content from the perspective view of the UAV 104.

Figure 2A:
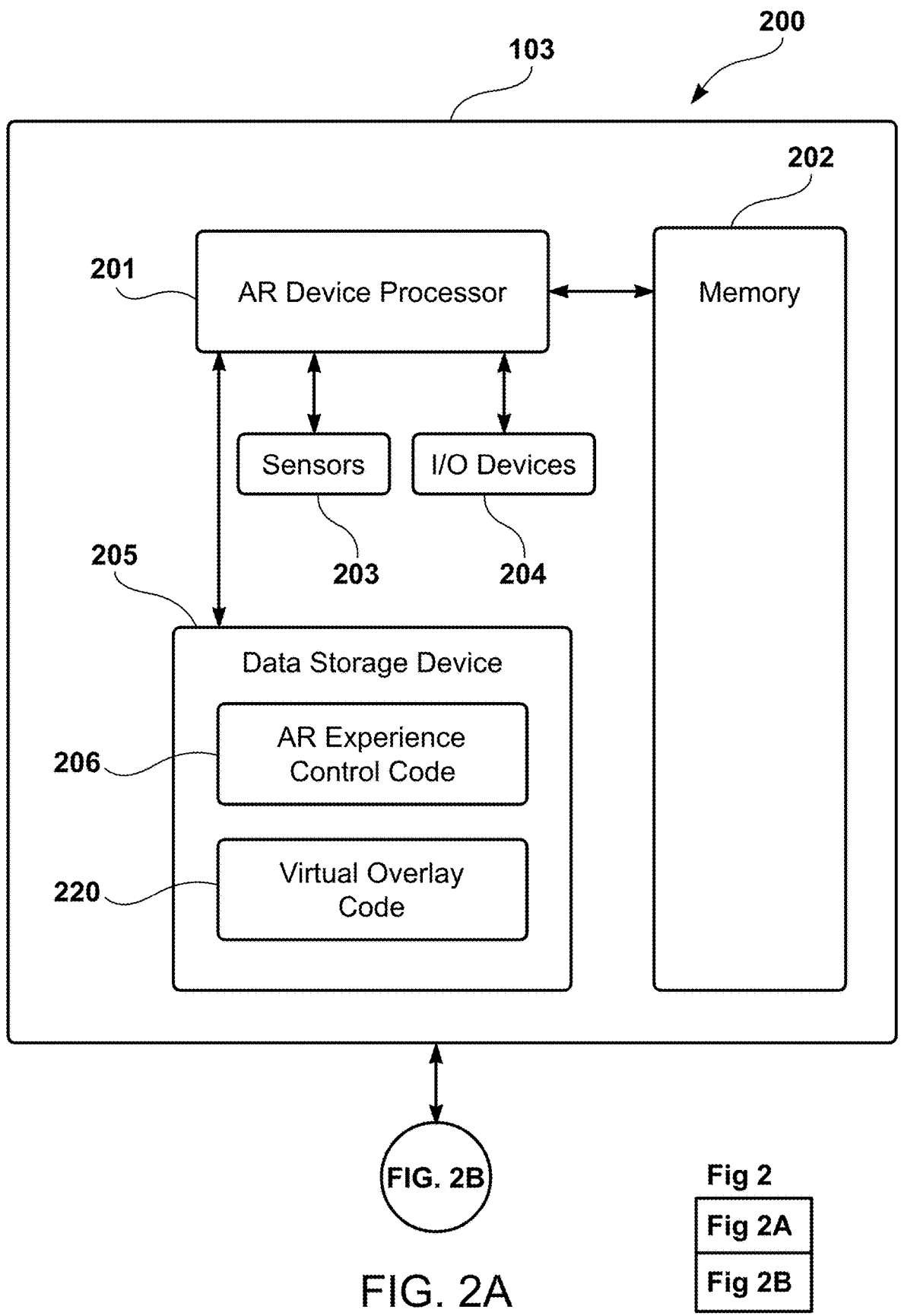
FIG. 2A illustrates a system configuration for the AR device.
Figure 2B:
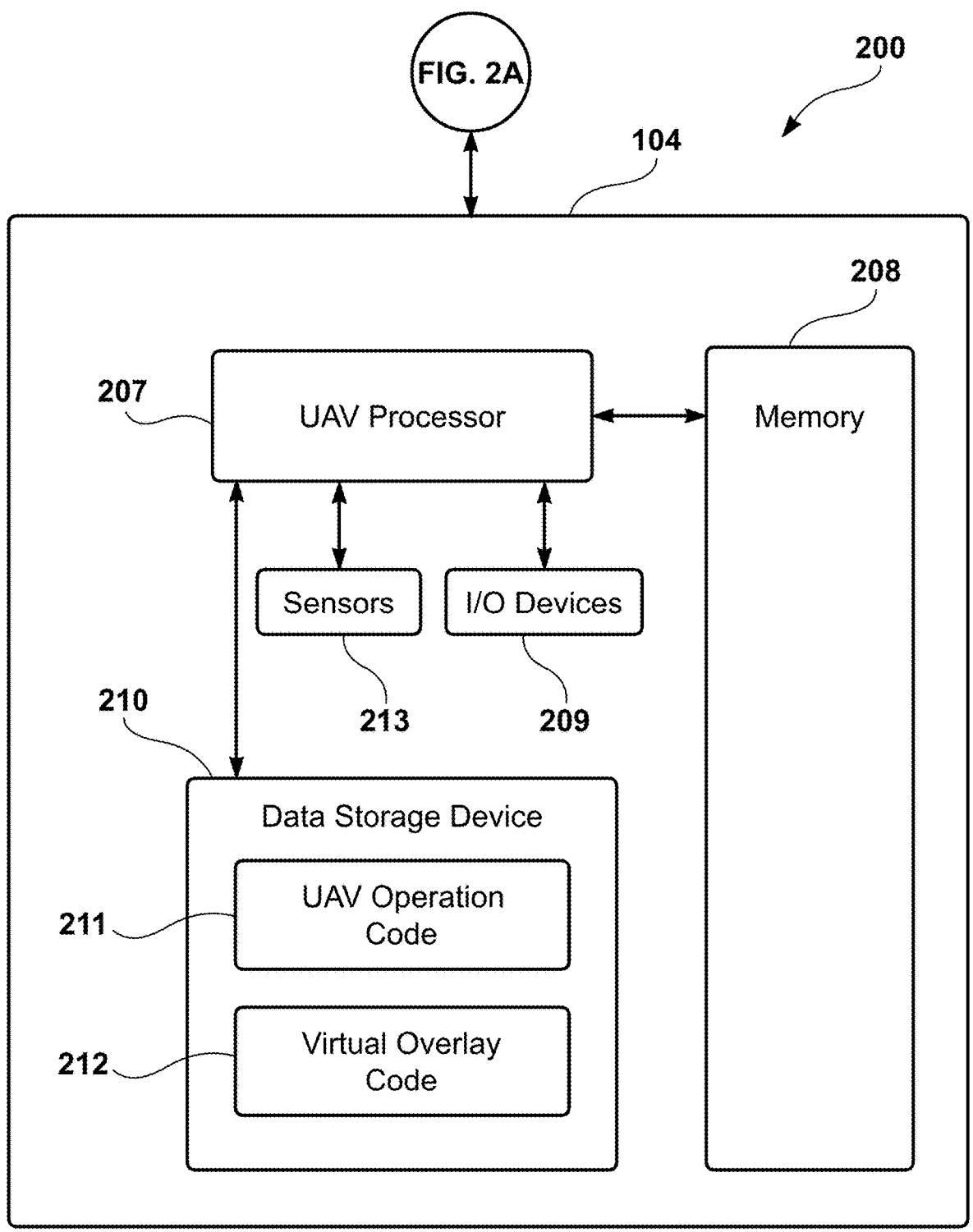
FIG. 2B illustrates a system configuration for the UAV.
Figure 2B:
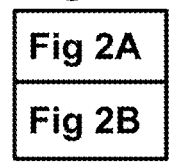

FIGS. 2A and 2B illustrate system configurations for the AR device 103 and the UAV 104. In particular, FIG. 2A illustrates a system configuration for the AR device 103. The internal components of the AR device 103 include an AR device processor 201, which may be specialized for generating an AR experience. For example, the AR device processor 201 may be capable of operating an AR game. In other words, the AR processor 201, alone or in conjunction with additional processors, has the computational capability to detect head movement of the user 151 (FIG. 1B) and interaction of the user 151 with various virtual elements detected by one or more sensors 203 (e.g., image capture devices); as a result, the AR processor 201 is capable of generating commands for displaying the virtual elements as AR overlay data based on sensed data, via the one or more sensors 203, or based on inputted/outputted data received via one or more input/output ("I/O") devices 204 (e.g., buttons, dials, microphones, etc.).

The AR device 103 may also include a memory device 202, which may temporarily store computer readable instructions performed by the AR processor 201. As an example of such computer readable instructions, a data storage device 205 within the AR device 103 may store AR experience control code 206 and virtual overlay code 220. The AR device processor 201 may execute the AR experience control code 206 to control the AR experience. For example, the AR processor 201 may determine when particular virtual elements should, or should not, appear within the AR experience based on the occurrence of one or more events within the AR experience (e.g., user interaction with virtual elements), as provided for by the AR experience control code 206. Further, the AR device processor 201 may execute the virtual overlay code 220 to generate one or more virtual overlay elements based on the viewing perspective of the AR device 103.

Further, FIG. 2B illustrates a system configuration for the UAV 104. The internal components of the UAV 104 include a UAV processor 207, which may be specialized for both operating navigation of the UAV 104 and generating the AR content experience for the UAV 104 simultaneously with the AR content experience being generated by the AR device 103. In particular, the UAV 104 may have one or more I/O devices 209 (e.g., receiver, transmitter, transceiver, etc.), which may receive navigation commands from a human operator. For example, a second user viewing a first user within the AR environment may want to adjust the viewing angle of the UAV 104. Accordingly, the second user may provide one or more navigation commands to the UAV 104 to make such viewing angle adjustments. Alternatively, the UAV 104 may autonomously determine, via the UAV processor 207, navigation commands. A user may select from one or more predetermined views (e.g., overhead, third person, first person, side, front, etc.); the UAV 104 may then autonomously determine navigation commands to and from the position/orientation associated with the predetermined view. For instance, the predetermined views may include a close view, expansive view, a view focusing on the facial expressions of a user, a view focusing on AR elements, etc.

Additionally, the UAV processor 207 may determine an optimal viewing angle based on the various makeup of a particular AR environment (e.g., people, objects, etc.), and dynamically generate navigation commands to fly to, or hover at, positions within the AR environment conducive to that optimal viewing angle. The UAV processor 207 may be in operable communication with one or more sensors 213 (e.g., cameras) that determine the location of the UAV 104 within the AR environment, and may determine navigation commands based on the sensed location data. Moreover, the UAV 104 may autonomously, and dynamically, determine an optimal distance from the user 151 illustrated in FIG. 1B. Based on various factors (lighting, presence of other people or objects, etc.), the UAV 104 may determine how close the UAV 104 should be to the user 151 to capture the most optimal image quality. As an example, the AR device 103 may provide an optimal viewing position and/or orientation to the UAV 104 while the UAV 104 manages flight stabilization and object avoidance. As one more alternative, the UAV processor 207 may determine an optimal position based on both autonomous decision making and input from a human operator.

The UAV 104 may also include a memory device 208, which may temporarily store computer readable instructions performed by the UAV processor 207. As an example of such computer readable instructions, a data storage device 210 within the UAV 104 may store UAV operation code 211 and virtual overlay code 212. The UAV processor 207 may execute the UAV operation code 211 to navigate the UAV 104 autonomously, via a human operator, or both. Further, the UAV processor 207 may operate the virtual overlay code 212 to generate the virtual overlay elements from the perspective of the UAV 104 rather than from the perspective of the AR device 103.

In one embodiment, the AR device 103 illustrated in FIG. 2A and the UAV 104 illustrated in FIG. 2B communicate with each other to allow the UAV 104 to somewhat rely on processing performed by the AR device 103. For example, the AR device processor 201 may be responsible for performing game operations, such as generating commands regarding visual effects resulting from interaction between the user 151 and the virtual elements in the AR experience. Although the UAV 104 may capture the video and/or audio of the user 151 within the AR environment, the UAV processor 207 may rely on the AR device processor 201 to determine if the user 151 has interacted with virtual elements, and whether a video, and/or audio, effect that should be rendered as a result of such interaction. Accordingly, the AR device processor 201 may be specialized with sufficient hardware capabilities for performing game operations, whereas the UAV processor 207 may have less hardware capabilities given its reliance on the AR device processor 201 for performing AR content operations.

In an alternative embodiment, the server 101 illustrated in FIG. 1A, another cloud-based computing device, or a local computing device with wired or wireless communication capabilities for communicating with the AR device 103 and the UAV 104 may be used to perform game operations; such computing device may then provide virtual imagery manipulation data directly, or indirectly through the AR device 103, to the UAV 104. Further, such computing device may be configured to generate virtual overlays for either, or both, of the AR device 103 and the UAV 104.

Figure 3A:
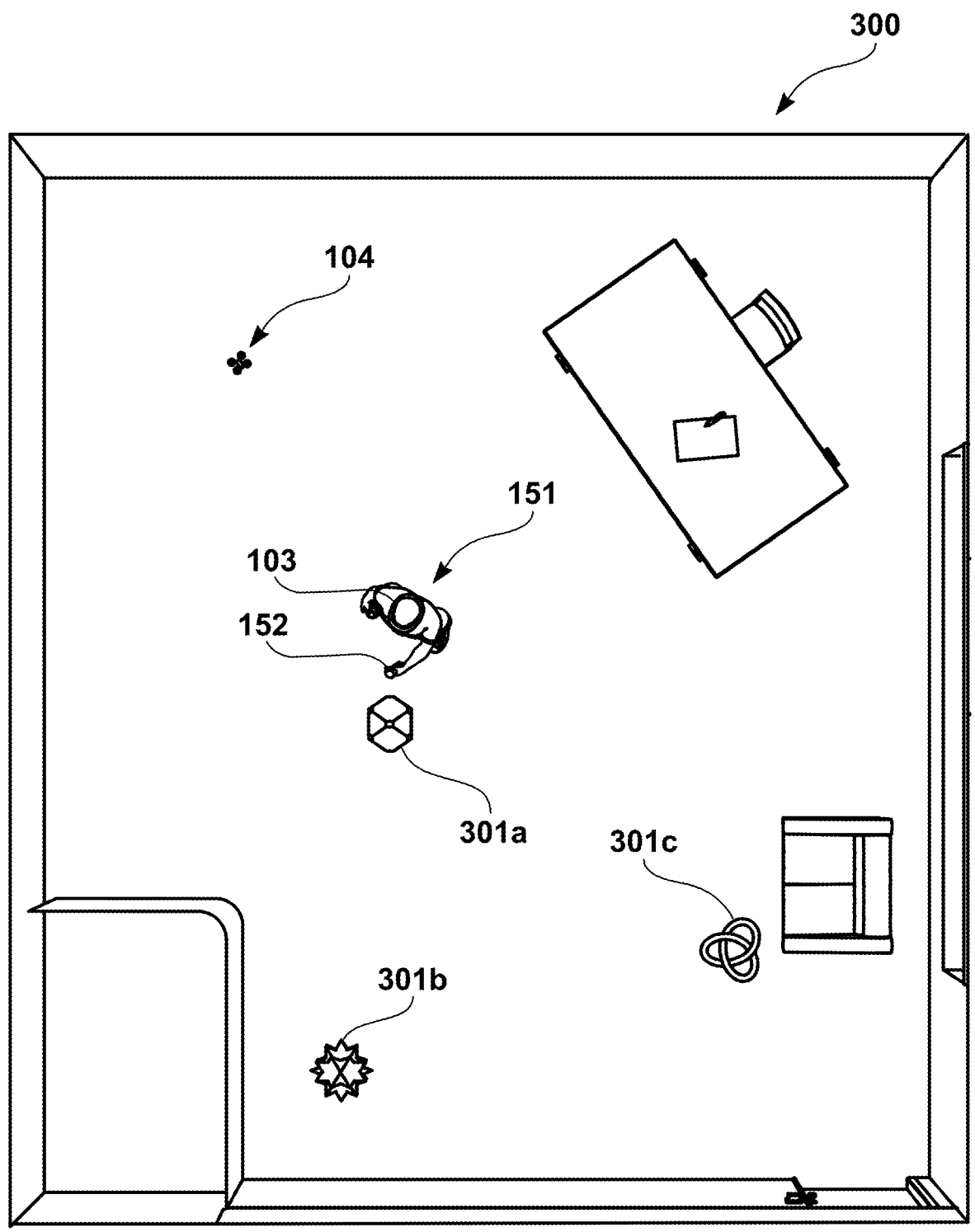
FIG. 3A illustrates a top view of the AR environment in which the user and the UAV are positioned.
Figure 3B:
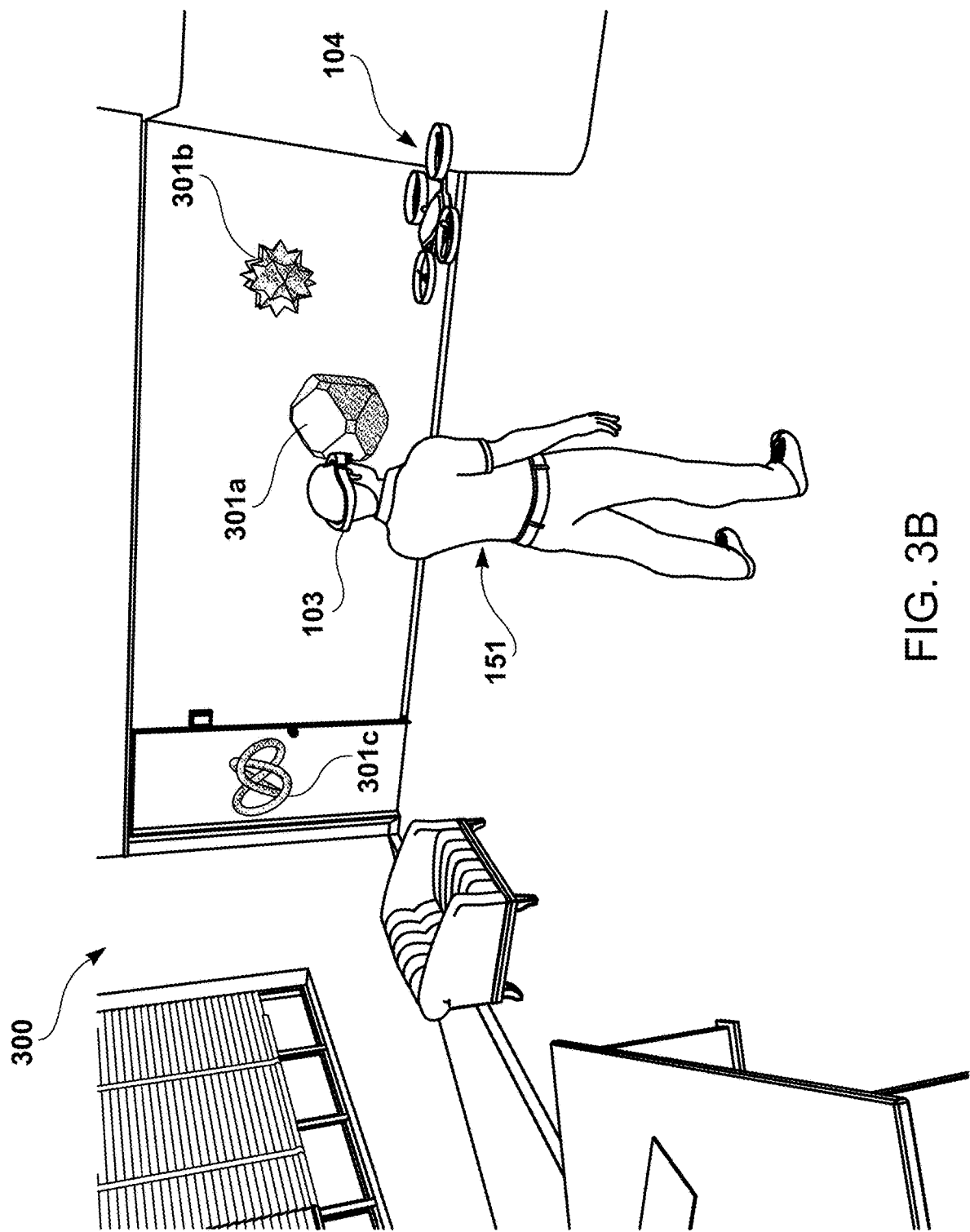
FIG. 3B illustrates a side perspective view of the AR environment.

FIGS. 3A and 3B illustrate an example of an AR environment 300 in which the AR content generation system 100 illustrated in FIG. 1A may be used by the user 151. For instance, the AR environment 300 may be a living room of the user 151. (Other examples of an AR environment include, but are not limited to, indoor and outdoor theme park attractions.)

In particular, FIG. 3A illustrates a top view of the AR environment 300 in which the user 151 and the UAV 104 are positioned. The user 151 is wearing the AR device 103 and is holding the AR device accessory 152. Further, FIG. 3A illustrates various overlay imagery 301a-c that may be generated by both the AR device processor 201 and the UAV processor 207. (Given that the views illustrated in FIGS. 3A and 3B are not from the viewing perspective of either the AR device 103 or the UAV 104, the overlay imagery 301a-c is depicted only for illustrative purposes to connote the presence of such imagery within the AR environment 300.) Moreover, FIG. 3B illustrates a side perspective view of the AR environment 300.

Figure 4B:
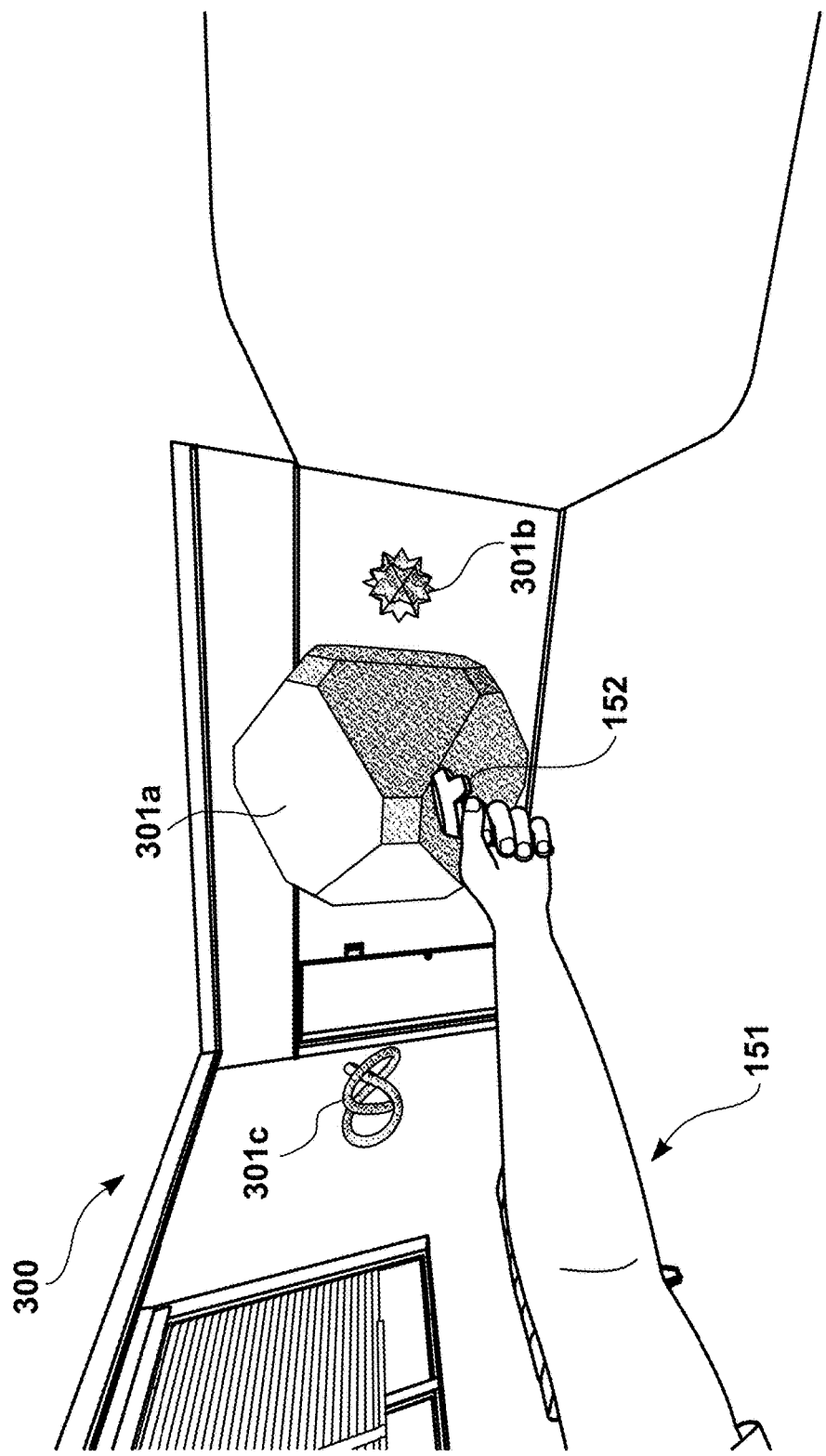
FIG. 4B illustrates the user lifting his or her hand holding a hand controller toward the overlay imagery.
Figure 4C:
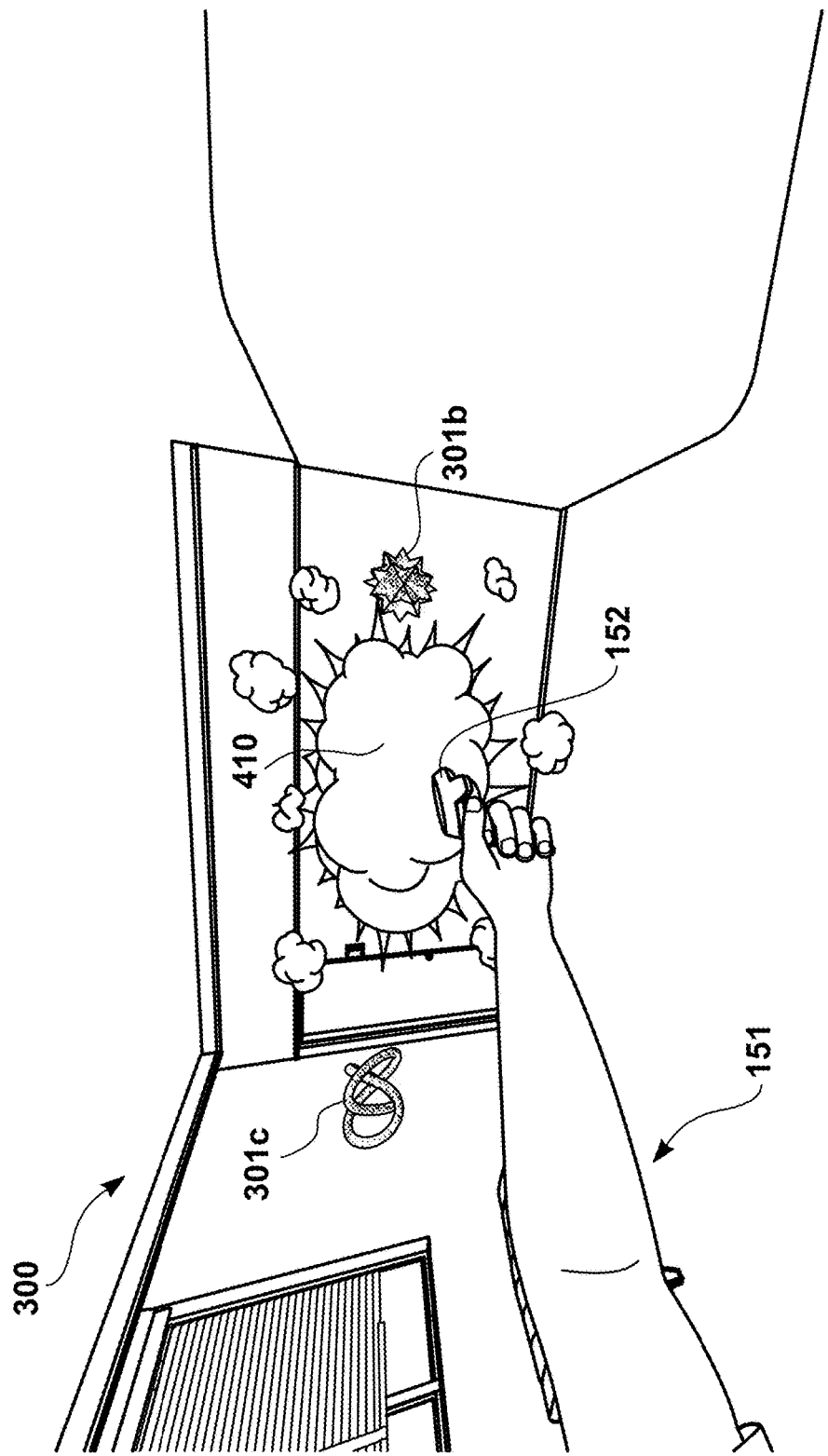
FIG. 4C illustrates an interactive effect that may be activated by the AR processor.

Further, FIGS. 4A-4C illustrate a user perspective view of the AR environment 300, illustrated in FIGS. 3A and 3B, as viewed by the user 151 through the AR device 103. For instance, FIG. 4A illustrates the overlay imagery 301a-c that is generated by the AR device processor 201 (FIG. 2A) for positioning within the AR environment 300. Based on the position of the user 151 within the AR environment 300, the AR device processor 201 calculates where overlay imagery 301a-c should be displayed within the AR environment 300. In addition, the AR device processor 201 may determine the position of the AR device accessory 152 with respect to the overlay imagery 301a-c. As an example, FIG. 4B illustrates the user 151 lifting his or her hand holding the AR device accessory 152 toward the overlay imagery 301a. The AR device 201 may determine such AR device accessory 152 movements (i.e., position and orientation) via tracking of the AR device accessory 152 and/or via communication (wireless or wired) with the AR device accessory 152. Upon detecting a particular position and/or orientation of the AR device accessory 152 with respect to the overlay imagery 301a, the AR device processor 201 may activate an interactive effect 410 (e.g., smoke, fireworks, etc.), as illustrated by FIG. 4C. (Although FIGS. 4A-4C illustrate detection of the position and/or orientation of the AR device accessory 152, such detection may be performed with a different device (e.g., smartwatch) or without any device at all (e.g., via 3D image recognition of the hand of the user 151).)

Figure 5A:
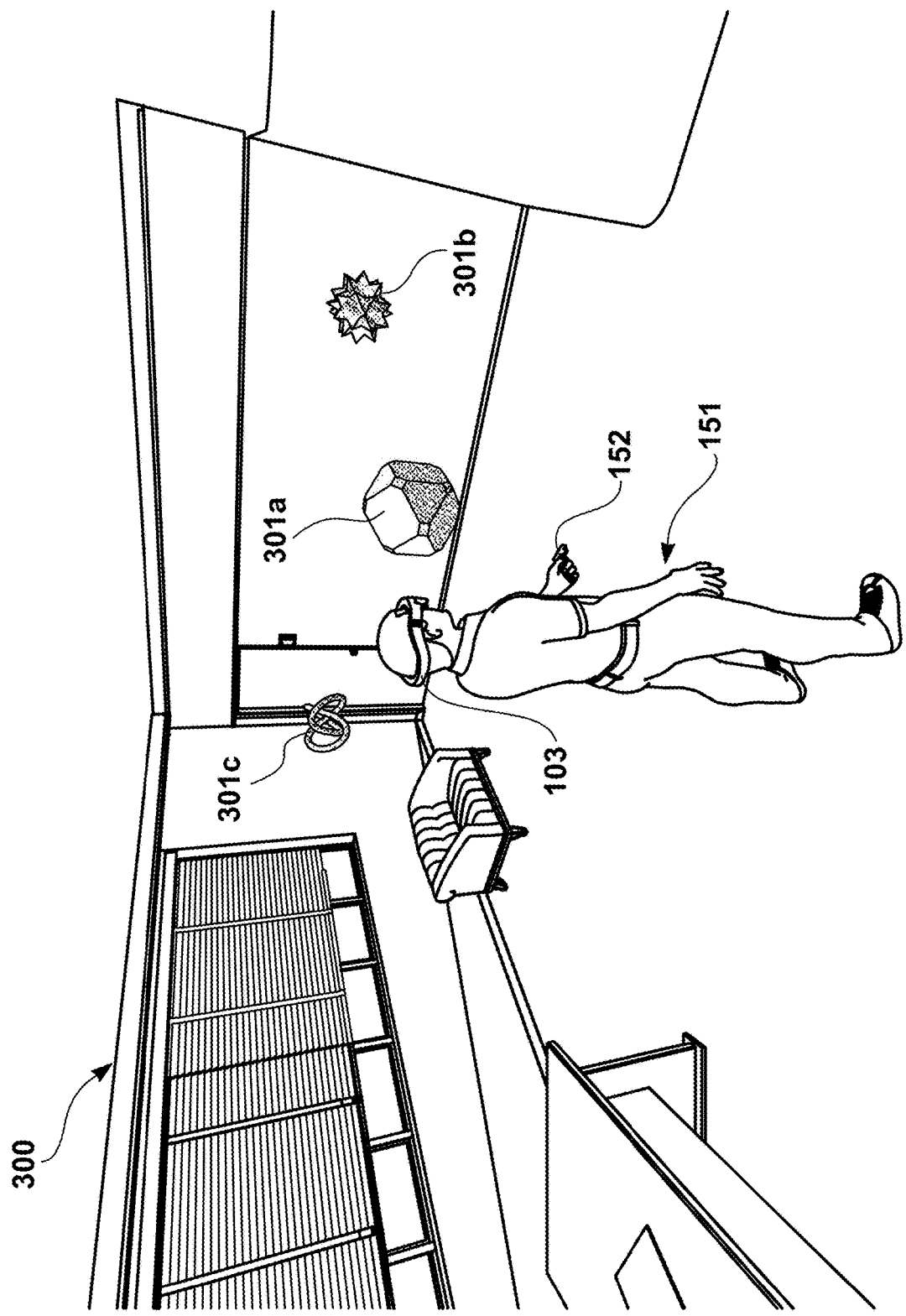
FIG. 5A illustrates the UAV viewing the real-world imagery viewed by the user, as illustrated in FIG. 4A, but from the perspective of the UAV.
Figure 5B:
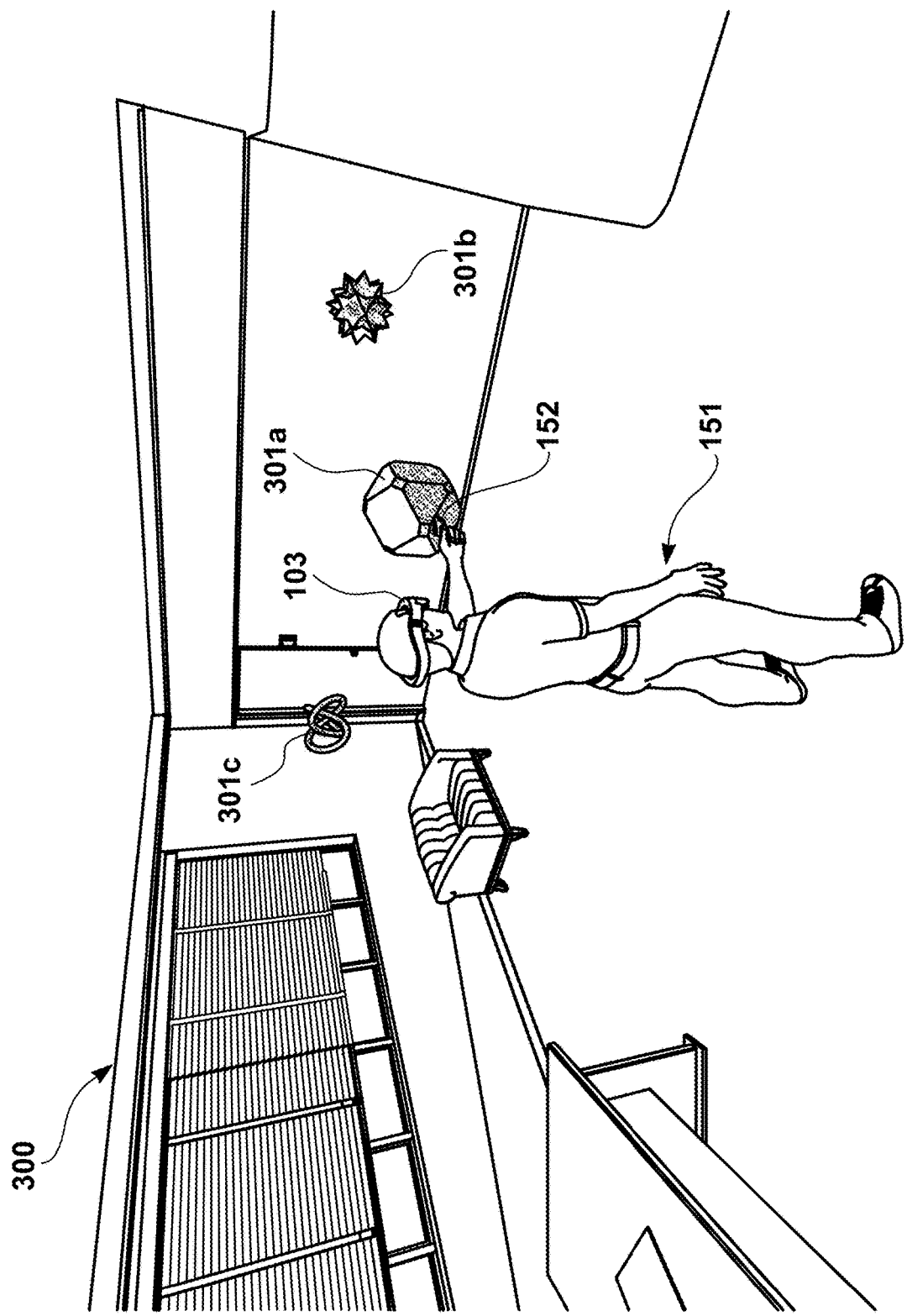
FIG. 5B illustrates the UAV viewing the interaction between the user and the virtual overlay imagery illustrated in FIG. 4B.
Figure 5C:
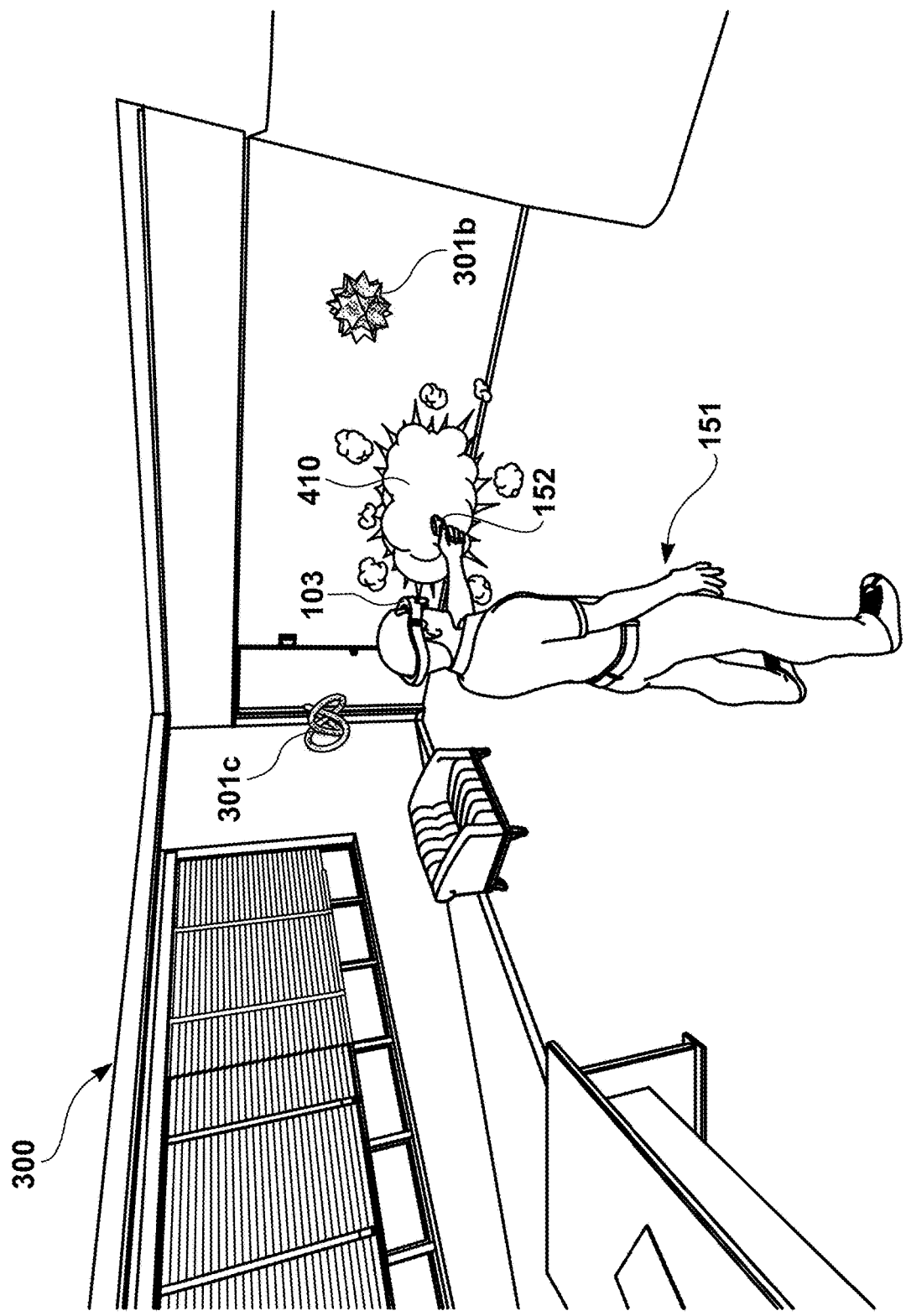
FIG. 5C illustrates the interactive effect being rendered by the UAV from the viewing perspective of the UAV, as a result of the AR device processor sending a command to the UAV processor to generate the interactive effect.

Moreover, FIGS. 5A-5C illustrate a UAV perspective view of the AR environment 300, illustrated in FIGS. 3A and 3B, as viewed by the UAV 104. For instance, FIG. 5A illustrates the UAV 104 viewing the real-world imagery viewed by the user 151, as illustrated in FIG. 4A, but from the perspective of the UAV 104. Further, the UAV 104 may simultaneously, or within an amount of time that is humanly perceptible as simultaneous, generate virtual overlay imagery 301a-c. In other words, both the AR device 103 and the UAV 104 generate overlay imagery 301a-c, but from different viewing perspectives. Alternatively, the AR device 103 may solely generate the overlay imagery 301a-c, and send it to the UAV 104. The UAV processor 207, as illustrated in FIG. 2B, may then calculate one or more offsets to transform the overlay imagery 301a-c from the user perspective to the UAV perspective. As yet another alternative, the server 101 illustrated in FIG. 1A may generate the virtual overlay imagery 301a-c for both the AR device 103 and the UAV 104, allowing each to generate its own offsets for a corresponding perspective view. As an example, the UAV 104 may initially capture the physical environment of the user, and utilize system latencies (predetermined or dynamically determined on-the-fly) to optimally overlay the virtual overlay imagery 301a-c into the captured video to produce an AR recording; such AR recording may be more accurate than that produced by prior AR configurations.

FIG. 5B illustrates the UAV 104 viewing the interaction between the user 151 and the virtual overlay imagery 301a-c illustrated in FIG. 4B. In the illustrated embodiment, although the UAV 104 captures real-world imagery of the user 151 interacting with the virtual overlay imagery 301a-c, the UAV processor 207, illustrated in FIG. 2B, may not be configured to modify the overlay imagery 301a-c. In other words, the UAV processor 207 may not perform an analysis as to whether a particular AR experience condition has or has not been met (i.e., no determination as to whether, or how, the user 151 has touched the virtual overlay imagery 301a) because it relies on the AR device processor 201 for such AR experience determinations.

Accordingly, FIG. 5C illustrates the interactive effect 410 being rendered by the UAV 104 from the perspective of the UAV 104, as a result of the AR device processor 201 (FIG. 2A) sending a command to the UAV processor 207 (FIG. 2B) to generate the interactive effect 410. Since the AR device 103 may be in closer proximity to the user 151 and the virtual overlay imagery 301a-c, the AR device 103 may calculate the position and orientation of the AR device accessory 152 more accurately, and reliably, than the UAV 104. In addition to proximity, the AR device 103 may have a more unobstructed vantage point than the UAV 104.

Thus, the AR device 103 may use the AR device processor 201, illustrated in FIG. 2A, to not only generate virtual overlay imagery 301a-c, but also make AR content decisions that affect the AR experience within the AR environment 300 from both the user perspective illustrated in FIGS. 4A-4C and the UAV perspective illustrated in FIGS. 5A-5C.

The UAV 104 may also stream or record the AR content experience. For example, one or more users at one or more remote computing devices may receive the streamed UAV perspective content (i.e., directly from the UAV 104 or indirectly from the AR device 103 or the server 101) to view the AR experience live in real-time with the actions of the user 151. As another example, the AR content experience may be recorded and uploaded to a social networking service for viewing by one or more friends of the user 151. (The foregoing examples are intended only as examples since the AR content may be streamed or recorded for a variety of different contexts.)

Figure 6A:
FIG. 6A illustrates the additional user viewing the interactive effect, either simultaneously in real-time with the user's participation in the AR experience or subsequent to such participation.
Figure 6B:
FIG. 6B illustrates the additional user viewing the AR content experience illustrated in FIG. 5C in a similar manner to that illustrated in FIG. 6A, but with an avatar in place of the user.

By recording or streaming the AR content experience of the user 151, as illustrated in FIGS. 3A-5C, the AR content generation system 100, illustrated in FIG. 1, may provide an additional user the ability to simultaneously, or subsequently, view the AR content experience as it is experienced by the user 151. FIGS. 6A and 6B illustrate an additional user 601 viewing the recorded or streamed AR content experience, from the perspective of the UAV 104, at a computing device 602 (e.g., laptop, desktop, smartphone, tablet device, smartwatch, etc.). As an example, FIG. 6A illustrates the additional user 601 viewing the interactive effect 410, either simultaneously in real-time with the user's participation in the AR experience or subsequent to such participation. The additional user 601 is able to simultaneously view the interactive effect 410, subsequently or as it occurs in real-time. In one embodiment, the AR content generation system 100, or a component associated therewith, may stream or upload the AR content experience to a social networking service, which may provide access to the AR content experience from the perspective of the UAV 104 to one or more friends of the user 151, such as the additional user 601. Further, the computing device 602 may have a graphical user interface ("GUI") 603 stored thereon for using the social networking service (i.e., accessing a social networking service account). The GUI 603 may allow the additional user 601 to view the AR content experience and chat with other friends of the user 151 via a chat box 604. In another embodiment, the AR content generation system 100, or a component associated therewith, may stream or upload the AR content experience via an application other than a social networking service, such as electronic mail, a cloud-based storage service, etc.

Although FIGS. 3A-5C illustrate the AR content experience, from the perspective of the UAV 104, being an actual real-world capture of the user 151, the AR content generation system 100 may, alternatively, generate different or modified imagery corresponding to the user 151. As an example, FIG. 6B illustrates the additional user 601 viewing the AR content experience illustrated in FIG. 5C in a similar manner to that illustrated in FIG. 6A, but with an avatar 610 in place of the user 151. Accordingly, in one embodiment, the AR content generation system 100, or a component associated therewith, may replace the real-world image of the user 151 with an avatar 610 (selected by the user 151 or the additional user 601). In another embodiment, the AR content generation system 100 may keep the real-world image of the user 151, but edit that real-world image to remove the AR device 103 and/or the AR device accessory 152. In place, the AR content generation system 100 may insert imagery on that real-world image of the user 151 (e.g., a hat, wand, etc.), rather than replacing the entire real-world image of the user 151; a resulting hybrid image of the user 151 would then be displayed by the computing device 602.

Figure 7:
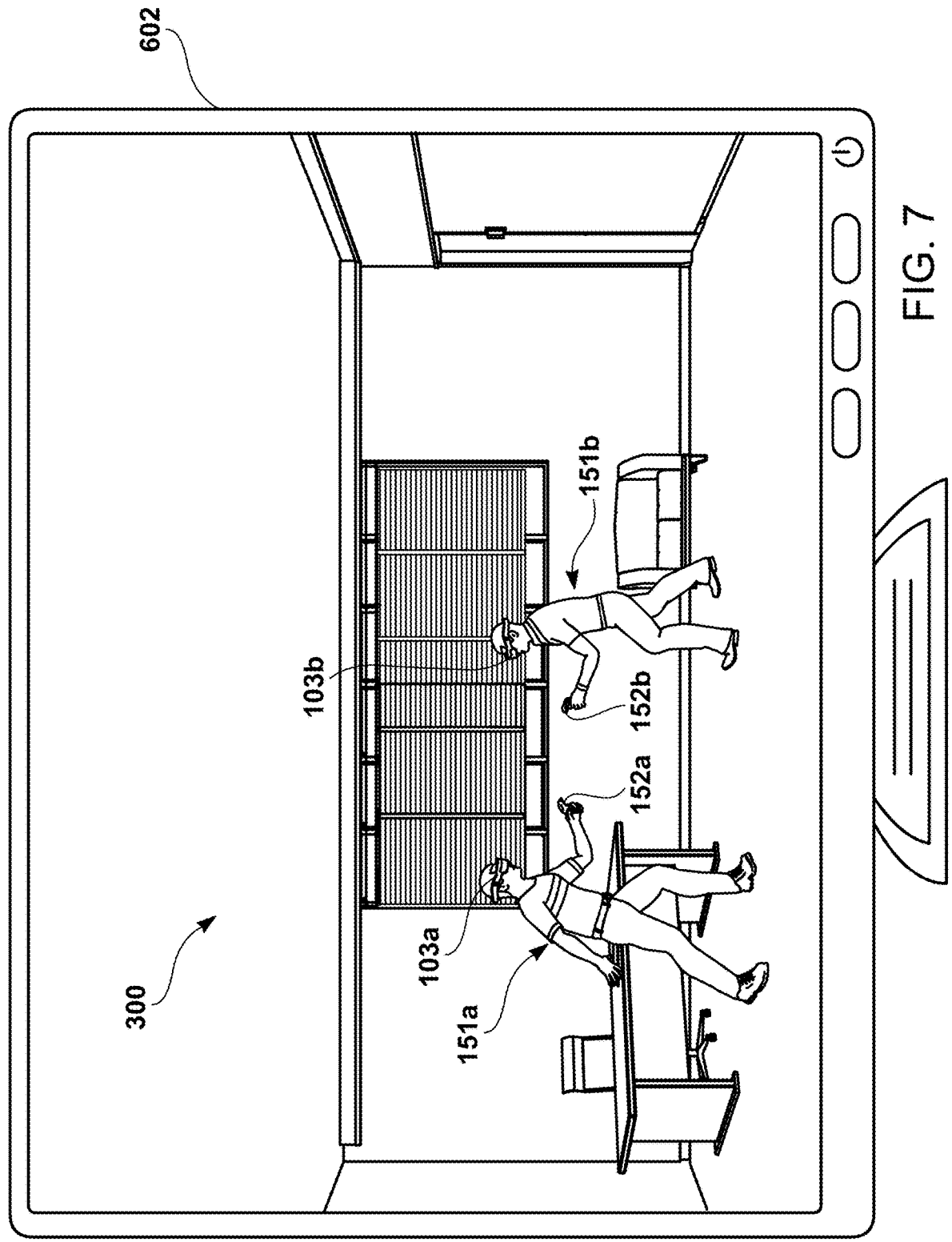
FIG. 7 illustrates the computing device, which may be viewed by one or more additional users distinct from the AR content experience participants, displaying an AR content experience from the viewing perspective of the UAV.

Although FIGS. 3A-6B illustrate only one user 151 participating in the AR content experience, multiple users may also be participants. In other words, the AR content generation system 100 may generate an AR content experience from the perspective of the UAV 104 that encapsulates multiple users 151a and 151b participating in a multi-user AR experience. FIG. 7 illustrates the computing device 602, which may be viewed by one or more additional users 601 distinct from the AR content experience participants 151a and 151b, displaying an AR content experience from the perspective of the UAV 104. As an example, the view of the UAV 104 may be a side view of the multiple users 151a and 151b that encapsulates a dueling match between the multiple users 151a and 151b, each wearing or holding AR devices 103a and 103b in addition to AR device accessories 152a and 152b, respectively. The AR content experience may be in its original form, modified form to include avatars 610 and corresponding accessories (e.g., swords in place of the AR device accessories 152a and 152b), or hybrid form to include real-world images of the multiple users 151a and 151b with some virtual accessories. Accordingly, the AR content generation system 100 may be used in conjunction with single-player or multi-player AR experiences.

Figure 8:
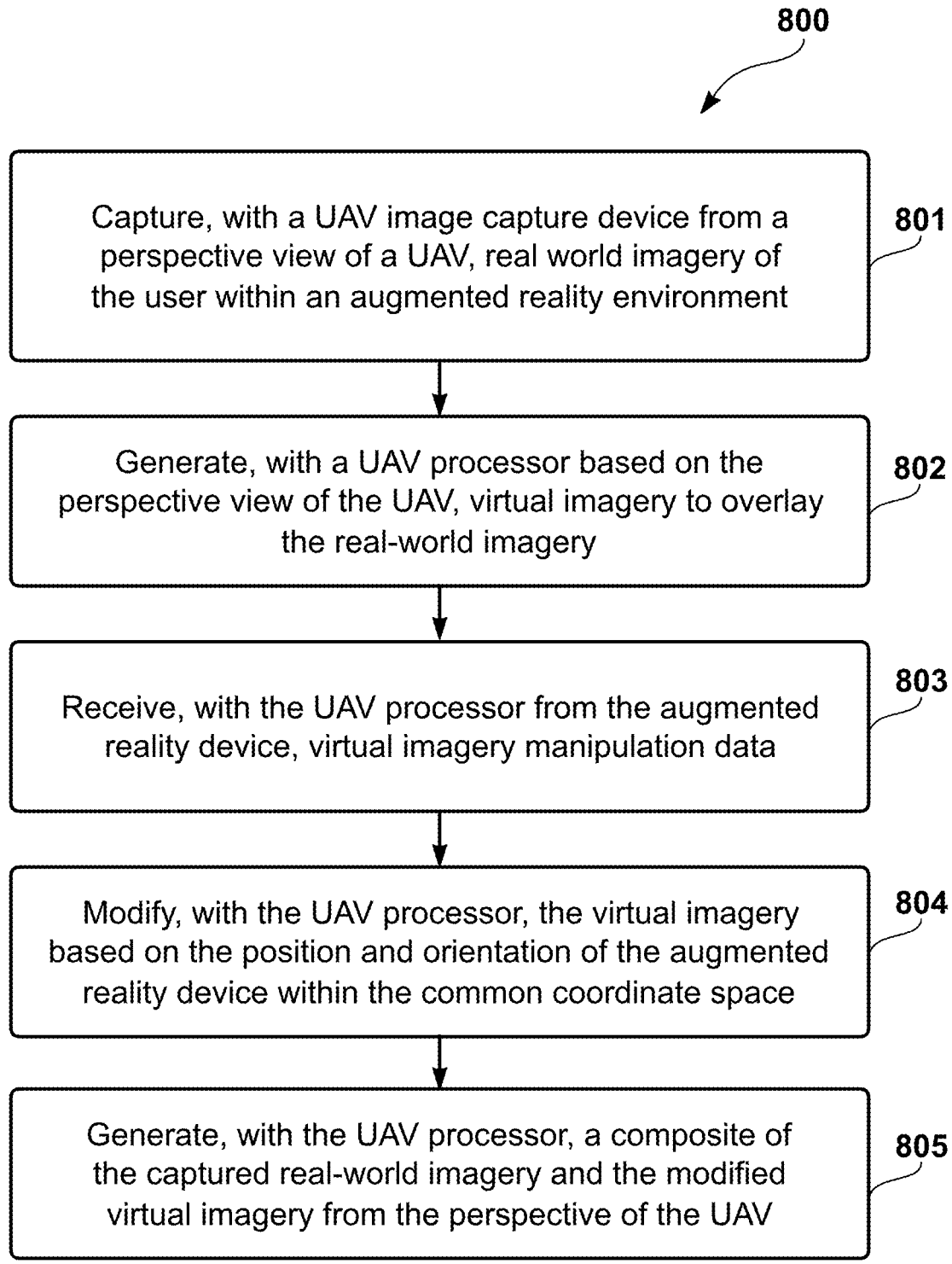
FIG. 8 illustrates a process that may be implemented by the UAV illustrated in FIG. 2B.

FIG. 8 illustrates a process 800 that may be implemented by the UAV illustrated in FIG. 2B. At a process block 801, the process 800 captures, with a UAV image capture device 170 (FIG. 1C) from a perspective view of the UAV 104 (FIG. 1A), real-world imagery of the user 151 (FIG. 1B) within the augmented reality environment 300. The UAV image capture device 170 may be adhered to the UAV 104. The perspective view of the UAV is distinct from a perspective view of the AR device 103 that occurs simultaneously with the perspective view of the UAV 104. The AR device is in contact (e.g., worn, held, etc.) with the user 151.

Further, at a process block 802, the process 800 generates, with the UAV processor 207 based on the perspective view of the UAV 104, virtual imagery to overlay the real-world imagery.

Moreover, at a process block 803, the process 800 receives, with the UAV processor 207 from the AR device 103, virtual imagery manipulation data. The virtual imagery manipulation data indicates a virtual interactive effect that is rendered by the AR device 103 from the perspective of the AR device 103 based on a position and an orientation of an augmented reality device accessory 152. The virtual imagery manipulation data further indicates the position and the orientation of the AR device within the common coordinate space 160 (FIG. 1C). The common coordinate space 160 is common to the UAV 104 and the AR device 103.

Additionally, at a process block 804, the process 800 modifies, with the UAV processor 207, the virtual imagery based on the position and the orientation of the augmented reality device accessory 152 within the common coordinate space 160. Finally, at a process block 805, the process 800 generates, with the UAV processor 104, a composite of the captured real-world imagery and the modified virtual imagery.

Additionally, the process 800 may perform, with the UAV processor 207, flight stabilization and object avoidance based on an optimal position and/or orientation of the UAV 104 determined by the AR device 103.

Figure 9:
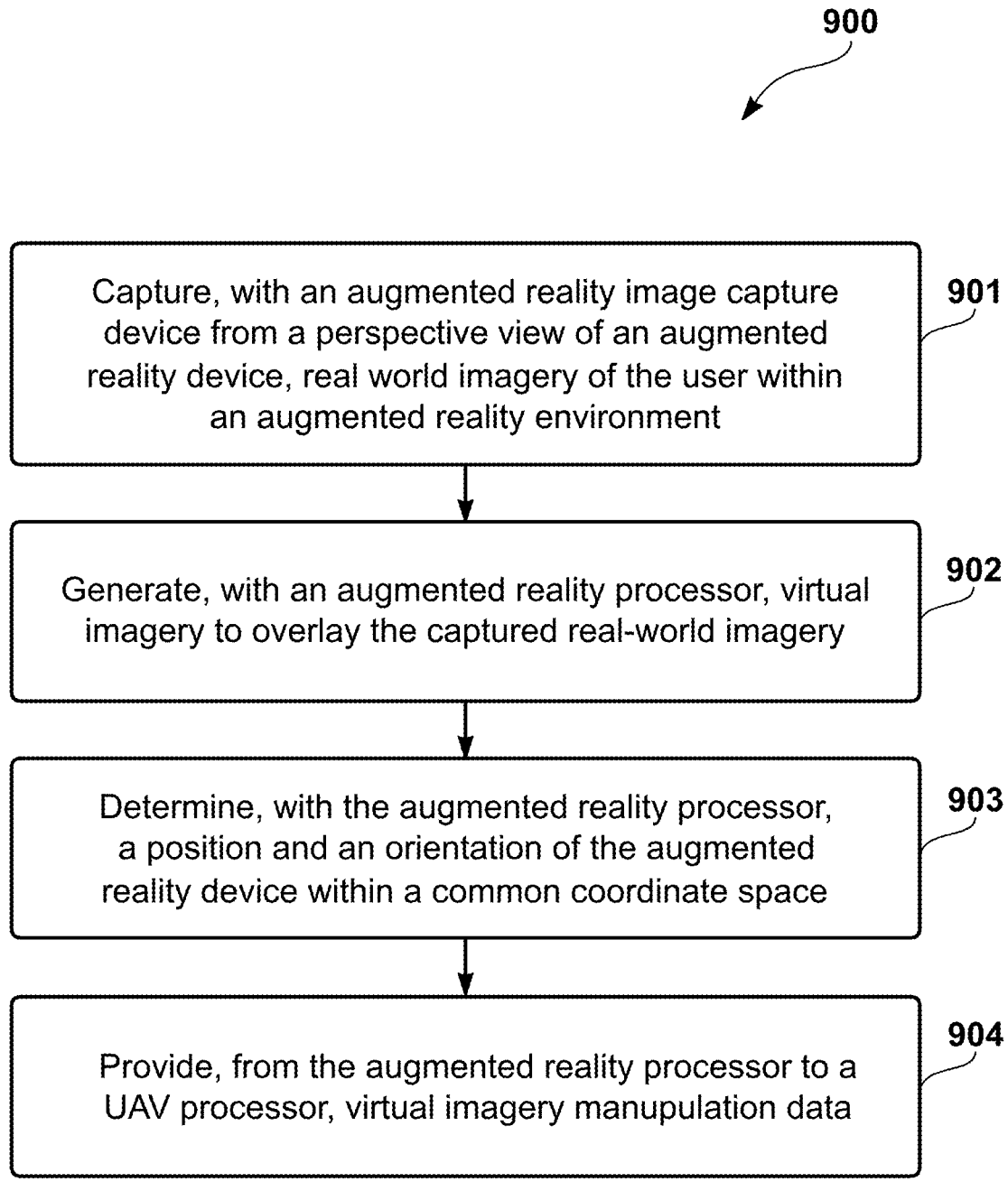
FIG. 9 illustrates a process that may be implemented by the AR device illustrated in FIG. 2A.

Further, FIG. 9 illustrates a process 900 that may be implemented by the AR device illustrated in FIG. 2A. At a process block 901, the process 900 captures, with an AR image capture device from a perspective view of the AR device 103, real-world imagery of the user 151 (FIG. 1B) within the AR environment 300 (FIG. 3A). The AR image capture device may be adhered to the AR device 103.

In addition, at a process block 902, the process 900 generates, with the AR processor 201, virtual imagery to overlay the captured real-world imagery.

Moreover, at a process block 903, the process 900 determines, with the AR processor 103, a position and an orientation of the AR device accessory 152 within the common coordinate space 160 (FIG. 1C). The common coordinate space 160 is common to the AR device 103 and the UAV 104 that simultaneously captures the real-world imagery from a perspective view of the UAV 104. The perspective view of the AR device 103 is distinct from the perspective view of the UAV 104.

Finally, at a process block 904, the process 900 provides, from the AR processor 201 (FIG. 2A) to the UAV processor 207 (FIG. 2B), virtual imagery manipulation data. The virtual imagery manipulation data indicates a virtual interactive effect that is rendered by the AR device 103 (FIG. 1A) from the perspective view of the AR device 103 based on the position and the orientation of the AR device accessory 152 (FIG. 1B). The virtual imagery manipulation data further indicates the position and the orientation of the AR device 103 within the common coordinate space 160 so that the UAV processor 207 modifies the virtual imagery from the perspective view of the UAV 104 based on the position and the orientation of the AR device accessory 152 within the common coordinate space 160 and generates a composite of the captured real-world imagery from the perspective view of the UAV 104 and the modified virtual imagery from the perspective view of the UAV 104. The UAV processor 207 is integrated within the UAV 104.

Additionally, the process 900 may generate, with the AR processor 201, an optimal position and/or orientation for the UAV 104, and send that optimal position and/or orientation to the UAV 104. The UAV 104 may then manage flight stabilization and object avoidance based on the provided data.

The processes described herein may be implemented in a specialized processor. Such a processor will execute instructions, either at the assembly, compiled or machine-level, to perform the processes. Those instructions may be stored on a computer readable medium (e.g., computer readable storage device) capable of carrying those instructions.

It is understood that the apparatuses, systems, computer program products, and processes described herein may also be applied in other types of apparatuses, systems, computer program products, and processes. Those skilled in the art will appreciate that the various adaptations and modifications of the aspects of the apparatuses, systems, computer program products, and processes described herein may be configured without departing from the scope and spirit of the present apparatuses, systems, computer program products, and processes. Therefore, it is to be understood that, within the scope of the appended claims, the present apparatuses, systems, computer program products, and processes may be practiced other than as specifically described herein.

We claim:

1. A computer program product comprising a non-transitory computer readable storage device having a computer readable program stored thereon, wherein the computer readable program when executed on a computer causes the computer to:

capture, with a UAV image capture device from a perspective view of a UAV, real-world imagery of a user within an augmented reality environment, the perspective view of the UAV being distinct from a perspective view of an augmented reality device that occurs simultaneously with the perspective view of the UAV, the augmented reality device being in contact with the user;

generate, with a UAV processor based on the perspective view of the UAV, virtual imagery to overlay the real-world imagery;

receive, with the UAV processor from the augmented reality device, virtual imagery manipulation data, the virtual imagery manipulation data indicating a virtual interactive effect that is rendered by the augmented reality device from the perspective of the augmented reality device based on a position and an orientation of an augmented reality device accessory, the virtual imagery manipulation data further indicating the position and the orientation of the augmented reality device accessory within a common coordinate space, the common coordinate space being common to the UAV and the augmented reality device;

modify, with the UAV processor, the virtual imagery based on the position and the orientation of the augmented reality device accessory within the common coordinate space; and generate, with the UAV processor, a composite of the captured real-world imagery and the modified virtual imagery.

2. The computer program product of claim 1, wherein the augmented reality device is selected from the group consisting of: a head-mounted display, augmented reality glasses, a smartphone, a tablet device, and a smartwatch.

3. The computer program product of claim 1, wherein the computer is further caused to perform the modification of the virtual imagery by offsetting one or more values of the virtual imagery according to the virtual imagery manipulation data.

4. The computer program product of claim 3, wherein the computer is further caused to perform the tracking via one or more markings on the augmented reality device.

5. The computer program product of claim 1, wherein the computer is further caused to determine a position of the augmented reality device by tracking the augmented reality device in the common coordinate space.

6. The computer program product of claim 1, wherein the common coordinate space is generated via construction of a map of the augmented reality environment.

7. The computer program product of claim 1, wherein the computer is further caused to generate the common coordinate space by synchronizing a UAV coordinate space with an augmented reality device coordinate space.

8. The computer program product of claim 1, wherein the computer is further caused to stream the composite to one or more viewing devices, the one or more viewing devices being distinct from the augmented reality device.

9. The computer program product of claim 1, wherein the computer is further caused to provide the composite to a server associated with a social media account of the a user operating the augmented reality device.

10. The computer program product of claim 1, wherein the computer is further caused to automatically position the UAV at a position of the perspective view of the UAV without receiving a corresponding command from a human operator.

11. A computer program product comprising a non-transitory computer readable storage device having a computer readable program stored thereon, wherein the computer readable program when executed on a computer causes the computer to:

capture, with an augmented reality image capture device from a perspective view of an augmented reality device, real-world imagery of a user within an augmented reality environment;

generate, with an augmented reality processor, virtual imagery to overlay the captured real-world imagery;

determine, with the augmented reality processor, a position and an orientation of an augmented reality device accessory within a common coordinate space, the common coordinate space being common to the augmented reality device and a UAV that simultaneously captures the real-world imagery from a perspective view of the UAV, the perspective view of the augmented reality device being distinct from the perspective view of the UAV; and provide, from the augmented reality processor to a UAV processor, virtual imagery manipulation data, the virtual imagery manipulation data indicating a virtual interactive effect that is rendered by the augmented reality device from the perspective view of the augmented reality device based on the position and the orientation of the augmented reality device accessory, the virtual imagery manipulation data further indicating the position and the orientation of the augmented reality device within the common coordinate space so that the UAV processor modifies the virtual imagery from the perspective view of the UAV based on the position and the orientation of the augmented reality device accessory within the common coordinate space and generates a composite of the captured real-world imagery from the perspective view of the UAV and the modified virtual imagery from the perspective view of the UAV, the UAV processor being integrated within the UAV.

12. The computer program product of claim 11, wherein the augmented reality device is selected from the group consisting of: a head-mounted display, augmented reality glasses, a smartphone, a tablet device, and a smartwatch.

13. The computer program product of claim 11, wherein the computer is further caused to determine the orientation of the augmented reality device accessory via one or more sensors in operable communication with the augmented reality device accessory.

14. The computer program product of claim 11, wherein the computer is further caused to control, with the augmented reality processor, flight operation of the UAV.

15. The computer program product of claim 11, wherein the computer is further caused to generate, with the augmented reality processor, an optimal position of the UAV, and send that position to the UAV to manage flight stabilization and perform object avoidance.

16. The computer program product of claim 11, wherein the augmented reality device has one or more markers adhered thereto, the one or more markers being tracked by the UAV to determine the position of the augmented reality device.

17. The computer program product of claim 11, wherein the common coordinate space is generated via construction of a map of the augmented reality environment.

18. The computer program product of claim 11, wherein the computer is further caused to stream the composite to one or more viewing devices, the one or more viewing devices being distinct from the augmented reality device from which the virtual reality imagery is received.

19. The computer program product of claim 11, wherein the computer is further caused to provide the composite to a server associated with a social media account of the a user operating the augmented reality device.

20. A system comprising:

an augmented reality device that captures, from a perspective view of a the augmented reality device, real-world imagery of a user within an augmented reality environment, generates virtual imagery to overlay the captured real-world imagery from the perspective view of the augmented reality device, and determines a position and an orientation of an augmented reality device accessory within a common coordinate space; and a UAV that captures, from a perspective view of the UAV, real-world imagery of the user within the augmented reality environment, determines a position of the UAV within the common coordinate space, generates virtual imagery to overlay the captured real-world imagery from the perspective view of the UAV, receives the position and the orientation from the augmented reality device accessory, modifies the virtual imagery based on the position and the orientation of the augmented reality device accessory within the common coordinate space, and generates a composite of the captured real-world imagery from the perspective view of the UAV and the modified virtual imagery from the perspective view of the UAV.

\* \* \* \* \*